United States Patent
Olsen et al.

[19]

[11] Patent Number: 6,102,625
[45] Date of Patent: Aug. 15, 2000

[54] WAVE DAMPENER FOR FLOATING STRUCTURES

[75] Inventors: Thomas Fred Olsen; Hans Øigarden, both of Oslo, Norway

[73] Assignee: Fred. Olsen, Oslo, Norway

[21] Appl. No.: 09/091,212

[22] PCT Filed: Nov. 26, 1996

[86] PCT No.: PCT/NO96/00279

§ 371 Date: Dec. 16, 1998

§ 102(e) Date: Dec. 16, 1998

[87] PCT Pub. No.: WO97/20729

PCT Pub. Date: Jun. 12, 1997

[30] Foreign Application Priority Data

Dec. 6, 1995 [NO] Norway ..................................... 954946
Jun. 10, 1996 [NO] Norway ..................................... 962441

[51] Int. Cl.[7] .............................. E02B 17/00; B63B 39/00
[52] U.S. Cl. ........................ 405/195.1; 114/122; 114/126; 114/264; 405/224
[58] Field of Search ................................. 405/195.1, 224, 405/204, 224.1; 114/122–126, 264, 265, 266, 267

[56] References Cited

U.S. PATENT DOCUMENTS

| | | | |
|---|---|---|---|
| 1,220,551 | 3/1917 | Power | 114/122 |
| 3,155,065 | 11/1964 | Strumskis | 114/122 |
| 3,224,401 | 12/1965 | Kobus et al. . | |
| 3,224,402 | 12/1965 | Kobus | 405/207 X |
| 3,285,216 | 11/1966 | Field et al. | 114/122 |
| 3,299,846 | 1/1967 | Jarlan | 405/195.1 X |
| 3,369,511 | 2/1968 | German | 114/122 |
| 3,389,674 | 6/1968 | Pratt | 114/122 |
| 3,397,545 | 8/1968 | Leavitt | 405/208 |
| 3,673,974 | 7/1972 | Harper . | |
| 3,797,440 | 3/1974 | Pangalila | 114/125 |
| 3,805,725 | 4/1974 | Pease et al. | 114/126 |
| 3,921,408 | 11/1975 | Lamy . | |
| 4,004,536 | 1/1977 | Bernier | 114/126 X |
| 4,137,987 | 2/1979 | Packett | 114/67 A |
| 4,232,623 | 11/1980 | Chou et al. . | |
| 4,576,520 | 3/1986 | Suh et al. | 405/195.1 X |
| 5,330,293 | 7/1994 | White et al. . | |

FOREIGN PATENT DOCUMENTS

| | | | |
|---|---|---|---|
| 129144 | 8/1974 | Denmark . | |
| 0119489 | 6/1986 | Japan | 114/126 |
| 421 773 | 2/1982 | Sweden . | |
| 2 009 693 | 6/1979 | United Kingdom . | |
| 2 200 082 | 7/1988 | United Kingdom . | |

*Primary Examiner*—Dennis L. Taylor
*Attorney, Agent, or Firm*—Pillsbury Madison & Sutro LLP

[57] ABSTRACT

A dampening device for dampening the vertical wave-induced motion component of a floating structure. The dampener projects in the form of a skirt down below the bottom of the floating structure (11) and consists of a plurality of channels (47) which extend substantially horizontally and converge from an inlet opening (27, 28, 36, 37, 38) to an outlet opening (16, 46) leading away from the floating structure (11). When the structure (11) moves downwards water is forced from the underside through the channels (47) and creates a jet effect which acts with dampening effect on the vertical motion of the structure.

The dampening device may also be made in the form of an outwardly projecting skirt on the floating structure and consist of a plurality of channels (17), where a number of first passages (27, 28) extend in a substantially vertical direction and merge into a number of second passages (29) which extend in an at least substantially horizontal direction, and thereby force the water from a substantially vertical direction of motion, through the first passages (27, 28), into a horizontal direction of motion through the second passages (29) during a part of the passage through the dampener (12).

A combination of the two dampeners, in that the dampener (12) is located immediately above the dampener (13) is also possible.

25 Claims, 5 Drawing Sheets

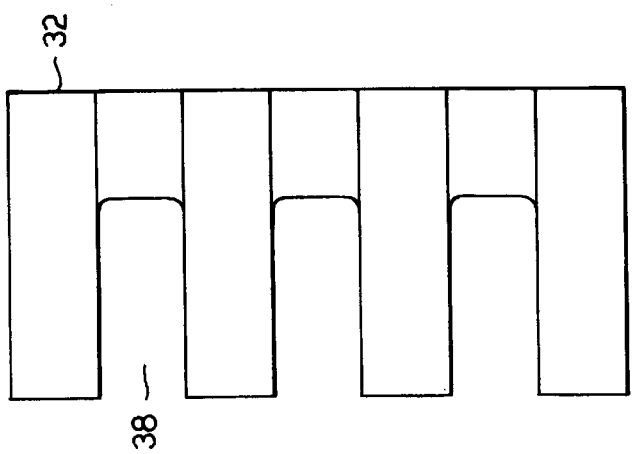
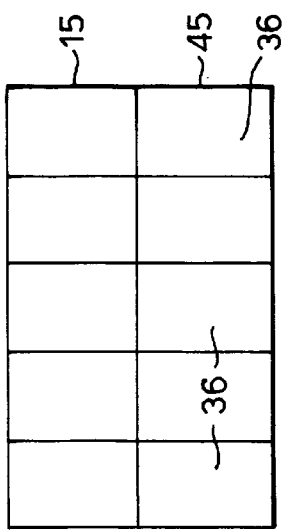
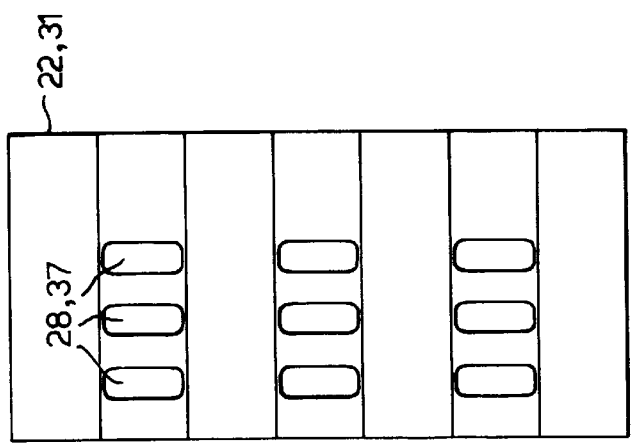
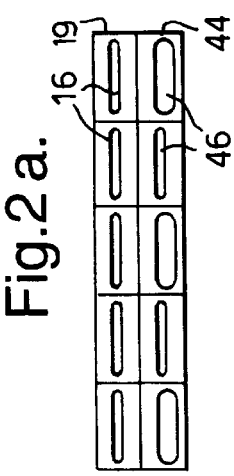
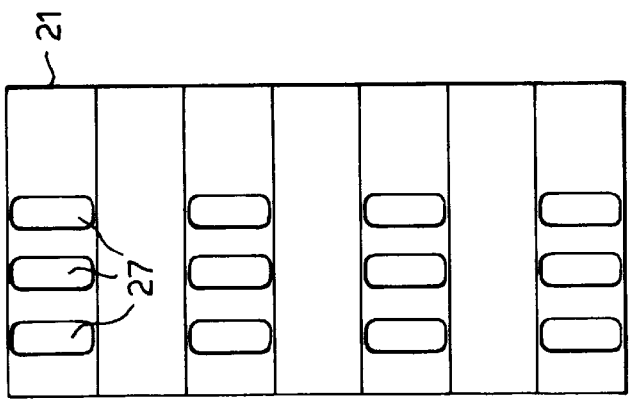
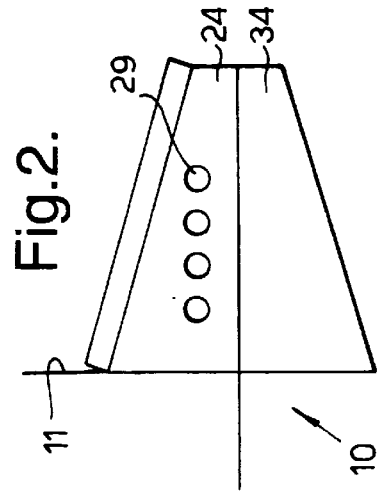

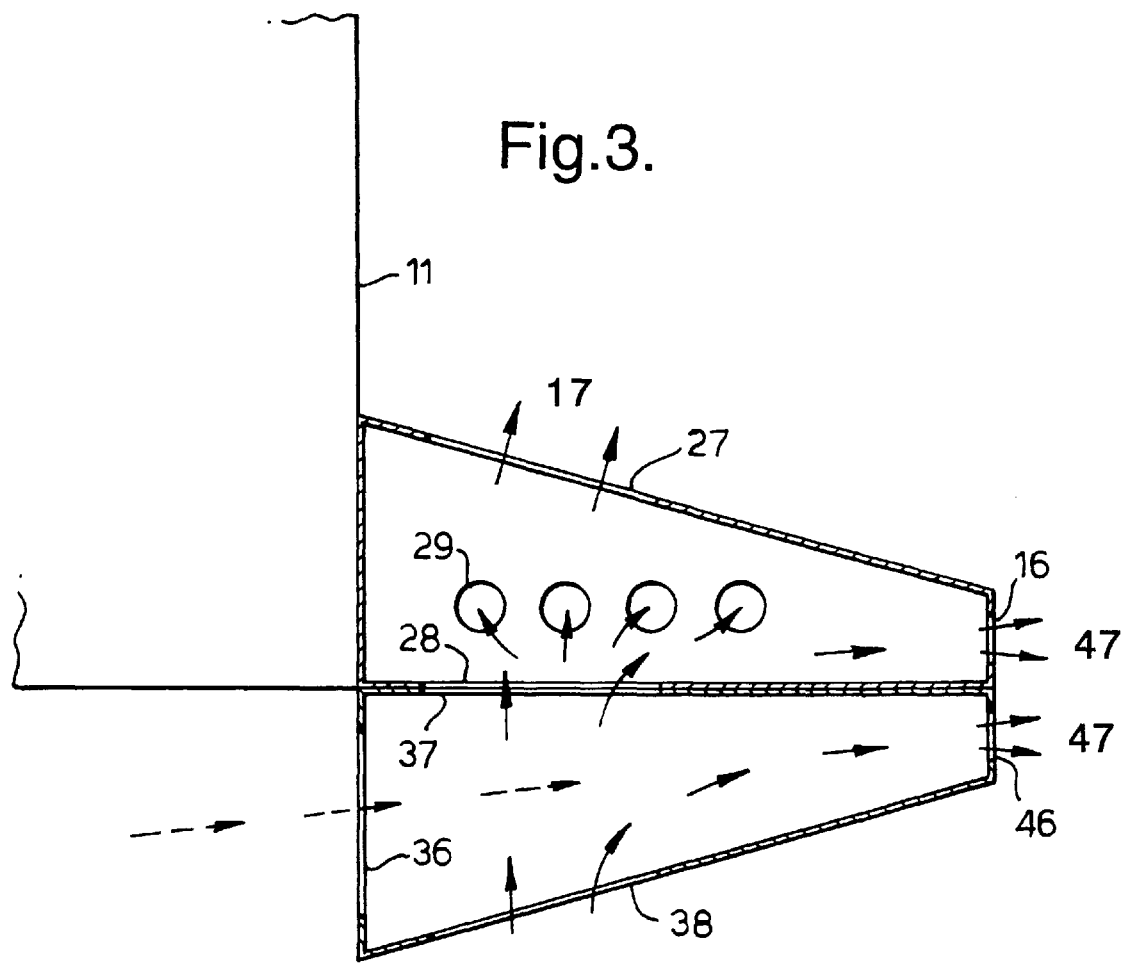

WAVE DAMPENER FOR FLOATING STRUCTURES

This application is the national phase of international application PCT/NO96/00279, filed Nov. 26, 1996 which designated the U.S.

The invention relates to a wave dampener for floating structures, and particularly, for dampening a vertical motion component of the floating structure.

U.S. Pat. No. 5,330,293 describes an oil platform of annular cross-section. At its lower end, the platform has a skirt which extends horizontally and serves to restrict wave-induced motion. Mooring means are also secured to the skirt. This wave dampening skirt is completely closed.

U.S. Pat. No. 3,673,974 teaches a platform having a large horizontal, perforated plate a small distance below the platform. It was in fact proposed that this type of dampener should be used on Norwegian production and drilling ship Petrojarl about 10 to 12 years ago. During experiments with models, use was made of whole horizontal plates suspended a small distance below the model. It was proven that these plates gave very little effect. They would nowhere near be able to justify the extra costs that would be incurred by equipping the ship which plates of this kind. Nor indeed was the Petrojarl built with dampening plates of this kind. To equip the plates with openings would increase the dampening effect a little, but would not be of any crucial significance. For a plate of this kind to be effective it must be located at a depth of at least 40 m, where the sea is considerably calmer than on the surface. It is self-evident that this is far too expensive to be profitable.

GB 2 200 082 teaches a similar dampening means, but here large ballast tanks are also provided in connection with the dampener. These ballast tanks serve no purpose other than to make the structure heavier, and thus have a marginal effect on the dampening of the wave-induced motion of the platform.

U.S. Pat. No. 3,224,401 teaches a platform equipped with two different types of dampeners. One type comprises horizontal perforated plates located along horizontal struts. Experiments with models carried out by the present applicant show that a dampener of this kind will have some effect during motion at speeds of 7 to 8 meters per second. However, normal speed of motion for a platform is in the range of between 1 and 4 meters per second. In this range, the dampener according to this U.S. patent will have very little effect. The second type of dampener comprises passages through vertical struts. This dampener causes the platform to lose buoyancy, but otherwise has very marginal effect on the dampening of motion. The dampeners according to U.S. Pat. No. 3,224,401 are only suitable for use in relatively fine weather, as is often found in the Gulf of Mexico, and would have an almost insignificant effect under the tough weather conditions experienced in, e.g., the North Sea.

GB 2 009 693 teaches a concrete tower equipped with passages which extend in an arch from the horizontal direction to an upward direction of about 45°. This means will dampen the heaving motion and prevent the tower from heeling over. However, the dampeners have a highly complex design, which means that they must be cast in concrete. This results in a considerable maintenance problem, and the dampeners will only be suitable for a concrete tower, and not a platform The concrete tower will, in fact, have a very small loading capacity. At the bottom of the concrete column a number of cells are constructed, which have very little effect on the dampening since these merely help to make the structure heavier in that the cells will hold water masses.

U.S. Pat. No. 3,921,408 teaches a device comprising vertical and horizontal beams located on the outside of a structure that is to be protected. This device is first and foremost suitable for dampening spray from waves, and will not have any effect in terms of dampening wave-induced motion of a floating structure.

U.S. Pat. No. 4,232,623 teaches a barge which is equipped with a plurality of openings in the side. These opening will absorb wave spray, but will only slightly dampen wave-induced motion, and this is because the extra water mass which the barge carries with it in the hull causes the barge to become heavier. The device according to U.S. Pat. No. 4,232,623 will only be suitable in moderate seas since the barge has very little buoyancy.

SE-421 773 teaches a device for dampening the motion of the water surface in the channel of ascent and descent for a submarine vessel. A chamber is provided around the channel which communicates with the channel via a number of openings. In the chamber there are also provided horizontal partition walls, in which openings are made. The purpose of this is not to dampen the motion of the platform, but to dampen the motion of the water surface in the channel of ascent and descent, i.e., to stop the so-called geyser effect.

DK 129 144 teaches a breakwater consisting of a horizontal grating and an inclined grating. This device will be effective in preventing the spray of waves from breaking over a jetty, for example. However, if it were to be mounted on a floating structure, it would not be further conducive to dampening wave-induced motion.

The objective of the present invention is to provide a more effective wave dampener, which in spite of its small size will dampen wave-induced motion to a far greater extent than previously known wave dampeners.

This is achieved by a dampening device including an upper wall section, a lower wall section, a first side wall section and a second wall side section. The wall sections each have a rear edge and a front edge. The upper wall section is joined to the upper portions of the first side wall section and the second side wall section. The lower wall section is joined to lower portions of the first side wall section and said second side wall section. These joined wall sections define a channel, with a channel inlet opening being positioned between the front edges of the upper, lower, first side and second side wall sections and a channel outlet opening being positioned between the rear edges of the upper, lower, first side and second side wall sections. The wall sections converge from the front edges to the rear edges and away from the floating structure. The dampening device includes a plurality of the channel defining wall sections to form a plurality of channels.

In doing so, it is possible to convert the upward and/or downward motion of the floating structure into a laterally directed water jet. This acts to stabilise the floating structure in that the water jet increases the dampener in size in an illusory manner.

Other advantages of the invention are obtained by the features which are disclosed in the dependent claims. Special mention should be made of the possibility of forcing the water to move through narrow passages and in a way to be "held" by the dampener for a certain period of time before it is let through. In this way, more energy can be recovered from the water which can be used to dampen the vertical motions of the floating structure.

The invention will now be described in more detail with reference to the accompanying drawings, wherein:

FIG. 2 is a lateral sectional view of the dampener according to FIG. 1;

FIGS. 2a–2e are plan view of the individual plate sections of the dampener according to FIG. 1;

FIG. 3 is a lateral sectional view of the dampener according to FIG. 1, with indicated flow routes for the water;

Figure 1:
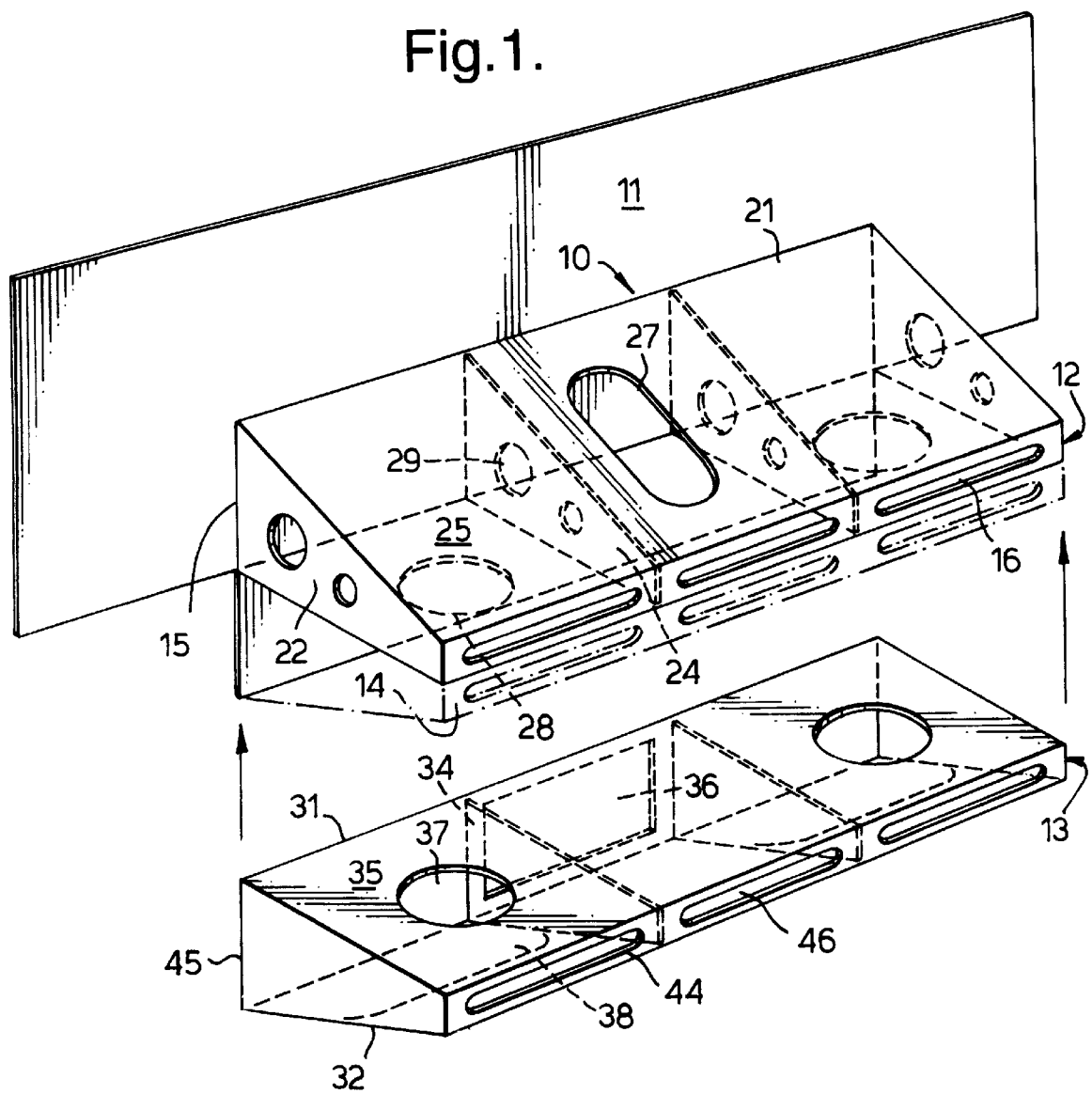
FIG. 1 shows in perspective a first preferred embodiment of a wave dampener according to the invention, where the lower dampener has been distanced somewhat from the upper dampener to make presentation clearer.

FIG. 1 shows a dampener 10, this being secured to a floating structure 11. It consists of two main components, an upper dampener 12 and a lower dampener 13. Each of the dampeners 12 and 13 have a double-walled structure, the upper dampener 12 having a top plate 21 and a bottom plate 22. The plates 21, 22 are connected at their forward edges 23 via an end wall 14 and via partition walls 24 which extend vertically transverse to the longitudinal extent of the plates 21, 22. The floating structure may define the front wall 15 of the upper dampener, but this may also consist of a separate plate. Compartments 25 are defined between the plates 21, 22 and the partition walls 24. In the top plate 21 and the bottom plate 22, there are provided openings, respectively 27 and 28. These are positioned alternately in the top plate 21 and in the bottom plate 22, so that alternate compartments 25 have an upwardly directed opening 27 and alternate compartments 25 have a downwardly directed opening 28. Openings 29 are also provided in the partition walls 24. In the end wall 14, at least one opening 16 is provided. Flow channels 17 are in this way defined in through either the openings 27 or 28, through the compartments 25 and out through the openings 28 or 27, depending upon whether the water moves upwards or downwards relative to the floating structure.

The lower dampener 13 is also double-walled and consists of a top plate 31 and a bottom plate 32. The plates 31, 32 are connected at their forward edges 33 via an end wall 44 and via dividing walls 34 which extend vertically transverse to the longitudinal extent of the plates 31, 32. The lower dampener 13 also has a front wall 45. Compartments 35 are defined between the plates 31, 32 and the partition walls 34. In the top plate 31 and the bottom plate 32 there are provided openings, respectively 37 and 38. These are located above alternate compartments 35 in the top plate 31 and in the bottom plate 32, so that alternate compartments 35 have an upwardly directed opening 37 and a downwardly directed opening 38. The partition walls 34 are constructed without openings. In the end wall 44 one opening 46 is provided. The front wall 45 is equipped with openings 36 inside the compartments 35 which do not have upwardly and downwardly directed openings 37, respectively 38. Flow channels 47 are in this way defined in through the openings 36 and/or 37 or 38, through the compartments 35 and out through the openings 46.

The openings 37 in the lower dampener 13 are located immediately below the openings 28 in the upper dampener 12, thereby forming a free passage through the lower dampener 13 and into the compartments 25 of the upper dampener.

In FIG. 2 the dampener 10 is shown in lateral section. Here, the partition walls 24 and 34 can be seen, where the partition wall 24 is equipped with openings 29.

FIG. 2a shows the end walls 14 and 46 of the dampener 10, which may consist of one common plate, having one row of openings 16 at the top and one row of openings 46 therebelow. The openings 46 are alternately of large and small opening area, the largest openings being located immediately in front of the openings 36 in the front wall 45.

FIG. 2b shows the front wall 15 and 45 of the dampener, which may also consist of one common plate. The openings 36 are also shown here.

FIG. 2c shows the top plate 21 with openings 27. FIG. 2d shows the bottom plate 22 of the upper dampener and the top plate 31 of the lower dampener, which most expediently are made of one common plate. This plate is equipped with openings 28, 37.

FIG. 2e shows the bottom plate 32 of the lower dampener, which plate is equipped with the openings 38.

FIG. 3 illustrates the function of the dampener where the solid lines illustrate the water flow through the openings 38, 37, 28, 27 and the openings 16 and 46 when the floating structure moves downwards. When the floating structure moves vertically the surrounding water will move vertically relative to the floating structure. The water will be forced up through the openings 38 in the bottom plate 32 of the lower dampener 13, through the openings 37, through the openings 28 in the bottom plate 22 of the upper dampener, horizontally through the openings 29 in the partition walls 24 and out through the openings 27 in the top plate 21, and vice versa when the structure 11 moves in the opposite direction. This flow route is designated channel 17.

In this way the water is forced to move in a labyrinth and is "held" by the dampener 10 for a certain period of time prior to being let through. Thus, more energy can be recovered from the water which can be used to dampen the vertical motion of the floating structure. It is essential that the openings through the dampener be adjusted to an optimal size. If the openings are too large the dampener will not be able to recover sufficient energy from the water to be able to function effectively. If the openings are too small the water will not be able to pass through the dampener. The same water will remain inside the dampener and quite simply follow the movements thereof, so that the dampener will function as a solid structure of a weight equal to the weight of the structure itself and the water therein. The optimal size of the openings will inter alia be highly dependent upon the vertical speed of motion of the floating structure.

In order to adjust the size of the openings closure means may be provided which can wholly or partly close the openings.

However, some of the water flows out through the openings 16 and produces a water jet which helps to generate resistance in the water against the vertical motions. This flow route is designated the channel 47.

The broken line shows the water flow in through the openings 36 and out through the openings 46. When the floating structure 11 moves downwards it will displace a large mass of water which is immediately below the structure. Normally, this water mass flows freely in all directions away from the structure 11. With the aid of the lower dampener 13, however, a large part of this water mass will be forced through the openings 36, through the chambers 35 and out through the openings 46. This flow route is also designated the channel 47.

The upper dampener 12 may also be used above water. In this case, it will serve to break waves on the surface, so that these do not build up and imperil the structure or wash over the deck. The dampener 12 does not necessarily need to be a closed structure, but may also, for example, be formed by a horizontal plate equipped with openings, from the outer edge of which plate there are provided a number of plates which alternatingly project upwards at an angle and downwards in the direction of the floating structure, in alignment with the openings. Thus, channels are formed between the inclined plates and through the openings.

It should be stressed that both the dampener 12 and the dampener 13 can be used alone with good effect. However, the best effect is achieved when the two dampeners are used together, in the way which has been described in the preceding exemplary embodiment.

Figure 4:
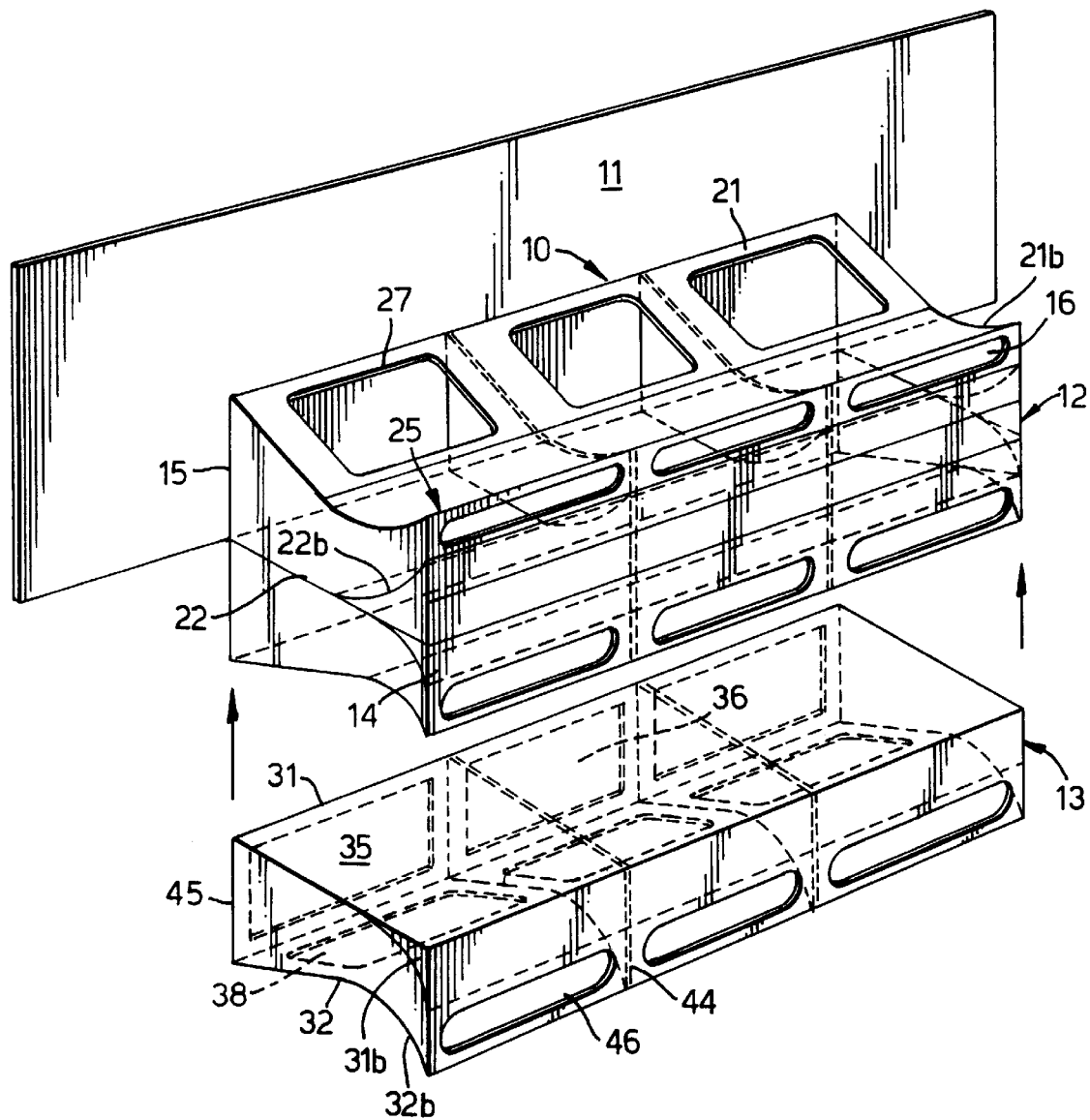
FIG. 4 shows in perspective a second preferred embodiment of a wave dampener according to the invention, where the lower dampener has been distanced somewhat from the upper dampener to make presentation clearer.

FIG. 4 shows an alternative embodiment of the damper. The damper is here also as a whole denoted with reference number 10. Likewise are all parts equivalent to parts in the first embodiment of FIGS. 1–3 denoted with the same reference numbers.

The damper 10 according to FIG. 4 also consists of two main components, an upper dampener 12 and a lower dampener 13. Each of the dampeners 12 and 13 have a double-walled structure, the upper dampener 12 having a top plate 21 and a bottom plate 22. The plates 21, 22 are connected at their forward edges 23 via an end wall 14 and via partition walls 24 which extend vertically transverse to the longitudinal extent of the plates 21, 22. The floating structure may define the front wall 15 of the upper dampener, but this may also consist of a separate plate. Compartments 25 are defined between the plates 21, 22 and the partition walls 24. In the top plate 21 there are provided openings, 27, but the bottom plate is closed, as opposed to the first embodiment. These openings 27 are positioned in the top plate 21, so that each compartments 25 have an upwardly directed opening 27. The partition walls 24 are closed in this embodiment. The top plate 21 and the bottom plate 22 have a curved plate part, respectively 21b and 22b, that curves upwardly towards their forward edges 23, so that each compartment 25 forms a curved tapering channel 47. The curve has preferably an elliptic form.

In the end wall 14 an opening 16 is provided. Flow channels 47 are in this way defined in through the openings 27, through the compartments 25 and out through the openings 16, when the water moves downwards relative to the floating structure.

The lower dampener 13 is also double-walled and consists of a top plate 31 and a bottom plate 32. The plates 31,32 are connected at their forward edges 33 via an end wall 44 and via dividing walls 34 which extend vertically transverse to the longitudinal extent of the plates 31, 32. The lower dampener 13 also has a front wall 45. Compartments 35 are defined between the plates 31, 32 and the partition walls 34. The top plate 31 is closed, as opposed to the first embodiment. The partition walls 34 are constructed without openings. The top plate 31 and the bottom plate 32 have a curved plate part, respectively 31b and 32b, that curves downwardly towards their forward edges 33, so that each compartment 35 forms a curved tapering channel 47. The curve has also here preferably an elliptic form.

If the dampener 13 is mounted to the side face of the floating structure 11 the bottom plate 32 is provided with openings 38. These openings 38 are positioned in the bottom plate 32, so that each compartments 35 have a downwardly directed opening 38. In this case the wall 45 is closed. If the dampener 13 is mounted as a skirt stretching below the bottom of the structure 11, the end wall 45 is provided with openings 36. In this case the bottom plate is closed.

The front wall 45 is equipped with openings 36 inside each compartment 35. Flow channels 47 are in this way defined in through the openings 36 or 38, through the compartments 35 and out through the openings 46.

In this second embodiment there is no fluid communication between the upper damper 12 and the lower damper 13.

Figure 5:
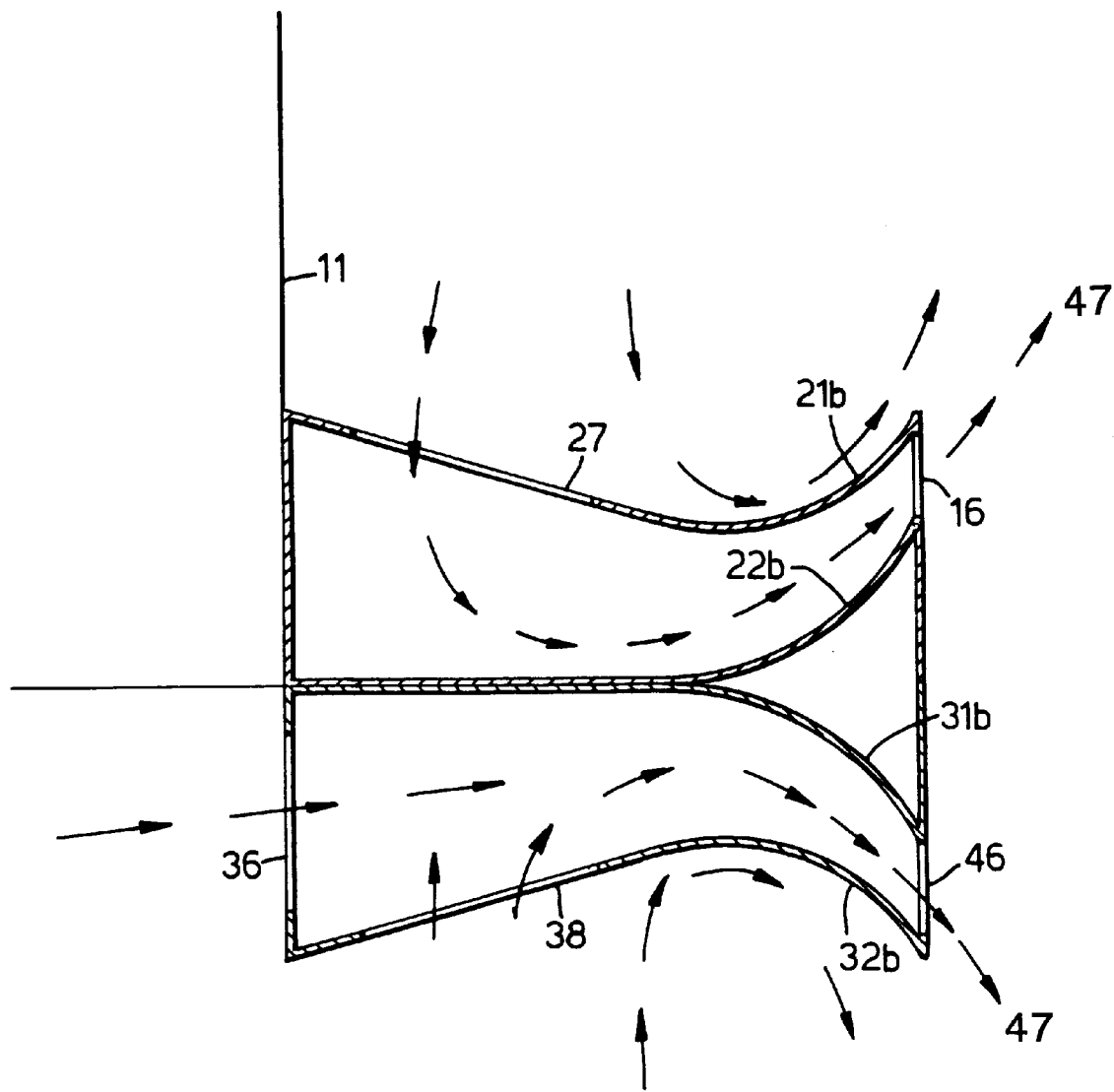
FIG. 5 is a lateral sectional view of the dampener according to FIG. 4.

FIG. 5 illustrates the function of the dampener according to FIG. 4, where the solid lines illustrate the water flow through the openings 38, 27, 16 and 46 when the floating structure moves downwards or upwards. When the floating structure moves vertically the surrounding water will move vertically relative to the floating structure. When the structure 11 moves downwards, the water will be forced up through the openings 38 in the bottom plate 32 of the lower dampener 13, and also from under the bottom of the structure 11 into the compartments 35 and out through the openings 46. This flow route is designated channel 47. Due to the downwardly curved and tapering compartments 35, the water will be ejected with high force sidewards and downwards. As for the first embodiment, the sideward component of the thrust generates a large illusory damper, and the downward component of the thrust generates a force acting opposite of the movement of the structure.

When the structure is moving upwards, the water will be forced through the openings 27 in the top plate 21 into the compartments 25 and out through the openings 16. This flowroute is designated channel 47. Due to the upwardly curved and tapering compartments 25, the water will be ejected with high force sidewards and upwards. As for the first embodiment, the sideward component of the thrust generates a large illusory damper, and the upward component of the thrust generates a force acting opposite of the movement of the structure.

Although the best effect is achieved when the both the upper dampener and the lower dampener is being used, it is also possible to use only one of the two on a floating vessel.

The dampener according to the invention can be used to dampen wave-induced motion on any conceivable floating structure, including ships, oil platforms and so forth. The dampeners may be provided as single dampeners which extend approximately horizontally along at least a part of the periphery of the vessel/structure, but several may also be arranged one on top of the other from the keel/lowermost edge to the deck.

Larger wave dampeners will be best suited for locating at the lowermost edge/keel, whilst smaller wave dampeners can be distributed more shallowly and near the waterline.

Although the device according to the invention in the above has been designated dampener, a second area of application for the invention does, however, also exist. Small water turbines, for example, can be placed in the channels 47 which exploit the energy in the water flow in order to produce electric power.

What is claimed is:

1. A dampening device for dampening a vertical motion component of a floating structure, the dampening device adapted for coupling to the floating structure and extending at least partially below a bottom of the structure, comprising an upper wall section, a lower wall section, a first side wall section and a second side wall section, said wall sections each having a rear edge and a front edge, said upper wall section joined to upper portions of said first side wall section and said second side wall section, said lower wall section joined to lower portions of said first side wall section and said second side wall section, said joined wall sections defining at least one channel, with a channel inlet opening being positioned between said front edges of said upper, lower, first side and second side wall sections and a channel outlet opening being positioned between said rear edges of said upper, lower, first side and second side wall sections, at least two of said wall sections converging from said front edges to said rear edges and away from the floating structure, the dampening device further including at least one additional side wall section for forming at least one additional channel.

2. A device according to claim 1, wherein said side wall sections extend substantially parallel to one another, said upper wall section being an upper plate and said lower wall section being a lower plate, said upper and lower plates converging so that a distance between the plates is less at said rear edges of said plates than at said front edges.

3. A device according to claim 2, wherein said side wall sections form partition walls between pairs of channels, said upper and the lower plates extending continuously across several channels.

4. A device according to claim 2, wherein said channel inlet opening is positioned on a front wall joined to the front edges of the wall sections and said channel outlet opening is positioned on a rear wall joined to the rear edges of the wall sections.

5. A device according to claim 1, wherein at least a portion of said upper plate and said lower plate are curved downward, so that the channels are curved downward to direct a portion of a flow of water through said channels out of the channel outlet openings downward.

6. A device according to claim 1, wherein at least a portion of said upper plate and said lower plate are curved upward, so that the channels are curved upward to direct a portion of a flow of water through said channels out of the channel outlet openings upward.

7. A device according to claim 1, wherein at least one of said upper plate and lower plate includes, respectively, one of an upwardly and a downwardly directed inlet opening which communicates with said outlet opening.

8. A device according to claim 2, wherein at least one of said side wall sections has at least one opening interconnecting adjacent channels.

9. A device according to claim 4, wherein a first set of channel defining wall sections have an inlet opening in said front wall, a second set of channel defining wall sections alternating with said first set of channels have a closed front wall, and said upper plate of said second set of wall sections have an opening.

10. A device according to claim 9, wherein said lower plate of said second set of wall sections have an opening.

11. A dampening device for dampening a vertical motion component of a floating structure, the dampening device being adapted for coupling to the floating structure and extending outwardly from the floating structure, said dampening device comprising a first wall with a plurality of inlet passages defined therethrough, a second wall with a plurality of outlet passages defined therethrough, and a plurality of channels defined through said dampening device, each of said channels creating communication between at least one of said inlet passages and at least one of said outlet passages, said channels allowing water to pass through said dampening device during vertical motion of said floating structure, said channels having a first channel section extending in a substantially vertical direction, a second channel section extending in an at least substantially horizontal direction, said first and second channel sections forcing water passing through said dampening device from a substantially vertical direction of motion relative to the floating structure into a substantially horizontal direction of motion, during at least a part of the passage of the water through the dampening device.

12. A dampening device according to claim 11, wherein the dampener comprises two approximately horizontally extending plates being spaced apart from one another, said inlet and outlet passages being defined respectively through said plates and said inlet passages being positioned such that they are not aligned with said outlet passages.

13. A dampening device according to claim 12, wherein the dampening device comprises a partition wall located between pairs of non-aligned inlet and outlet passages, said partition wall extending between said plates, said partition wall including passages therethrough.

14. A dampening device according to claim 13, wherein said plates have rear edges facing away from said floating structure, an opening being defined between said edges.

15. A device according to claim 7 wherein each of said upwardly directed inlet openings is in communication with a respective of said outlet openings.

16. A device according to claim 1, wherein an energy recovery device is located in said channel to recover energy from the water passing through the dampening device.

17. A dampening device for dampening the vertical motion component of a floating structure, the dampening device adapted for coupling to the floating structure and extending outwardly from the floating structure, comprising an upper wall section, a lower wall section, a first side wall section and a second side wall section, said wall sections each having a rear edge, said upper wall section adjoining said first side wall section and said second side wall section, said lower wall section adjoining said first side wall section and said second side wall section, said wall sections defining a channel, at least one of said upper and lower wall sections having at least one inlet opening to said channel defined therethrough, at least one outlet opening from said channel defined between said rear edge of said upper, lower, first side and second side wall sections, at least two of said wall sections converging from said inlet opening to said rear edge and away from the floating structure, the dampening device further including at least one additional side wall section for forming at least one additional channel.

18. A device according to claim 17, wherein said side wall sections extend substantially parallel to one another, said upper wall section being an upper plate and said lower wall section being a lower plate, said upper and lower plates converging so that the distance between the plates is less at said rear edges of said plates than at said inlet opening.

19. A device according to claim 18, wherein said side wall sections form partition walls between pairs of channels, said upper and the lower plates extending continuously across several channels.

20. A device according to claim 18, wherein said outlet opening is defined on an end wall joined to said rear edges of said wall sections.

21. A device according to claim 17, wherein at least a portion of said upper plate and said lower plate are curved downward so that the channels are curved downward to direct a portion of a flow of water through said channels out of the channel outlet openings downward.

22. A device according to claim 17, wherein at least a portion of said upper plate and said lower plate are curved upward so that the channels are curved upward to direct a portion of a flow of water through said channels out of the channel outlet openings upward.

23. A device according to claim 17, wherein one of said upper plate and lower plate respectively has an upwardly or downwardly directed inlet opening which communicates with said outlet opening.

24. A device according to claim 18, wherein at least one of said side wall sections has at least one opening interconnecting adjacent channels.

25. A device according to claims 17, wherein each said inlet opening is in communication with a respective of said outlet opening.

* * * * *